United States Patent [19]
Dahringer et al.

[11] Patent Number: 5,871,845
[45] Date of Patent: *Feb. 16, 1999

[54] ELECTRET FIBERS HAVING IMPROVED CHARGE STABILITY, PROCESS FOR THE PRODUCTION THEREOF AND TEXTILE MATERIAL CONTAINING THESE ELECTRET FIBERS.

[75] Inventors: Jörg Dahringer, Bobingen; Werner Groh, Lich; Hans-Tobias Macholdt, Darmstadt; Peter Boening, Wiesbaden, all of Germany

[73] Assignee: Hiecgst Aktiengesellshat, Germany

[*] Notice: The term of this patent shall not extend beyond the expiration date of Pat. No. 5,554,722.

[21] Appl. No.: 208,646

[22] Filed: Mar. 9, 1994

[30] Foreign Application Priority Data

| Mar. 9, 1993 | [DE] | Germany | 43 07 398.0 |
| Jun. 26, 1993 | [DE] | Germany | 43 21 289.1 |

[51] Int. Cl.⁶ .............................. C08G 69/26; D02G 3/00
[52] U.S. Cl. ......................... 428/378; 428/357; 428/364; 428/402
[58] Field of Search ...................... 428/373, 364, 428/357, 372, 402; 528/340, 180; 524/600, 602, 606

[56] References Cited

U.S. PATENT DOCUMENTS

| 4,789,504 | 12/1988 | Ohmori et al. |
| 5,304,227 | 4/1994 | Matsuura et al. ........................ 55/524 |
| 5,554,722 | 9/1996 | Eichenauer et al. ..................... 528/340 |

FOREIGN PATENT DOCUMENTS

| 0 180 655 | 5/1986 | European Pat. Off. |
| 0 315 082 | 5/1989 | European Pat. Off. |
| 0 315 083 | 5/1989 | European Pat. Off. |
| 0 375 781 | 7/1990 | European Pat. Off. |
| 0 476 648 A1 | 3/1992 | European Pat. Off. |
| 0 548 826 A2 | 6/1993 | European Pat. Off. |
| 38 39956A1 | 6/1989 | Germany. |
| 40 31705A1 | 4/1992 | Germany. |

OTHER PUBLICATIONS

Trotman, Dyeing and Chemical Technology of Textile Fibers, 1984, pp. 331–333.
Dyeing And Chemical Technology of Textile Fibers, Trotman.
Patent Abstracts Of Japan, vol. 12, No. 421 Nov. 1988.
Database WPI, Section CH, Week 8825, Derwent Publications Ltd. London, GB, Class A, AN 88–182123.
Biermann: "Evaluation of Permanently Charged Electrofibrous Fibers" DOE Nuclear Air Cleaning Conference, Denver, USA (1982).
Chemiefasern/Textilindustrie 40/92 (1990/9) S.T 123.
Journal of Electrostatics, 24 (1990) S.283–293.

Primary Examiner—Richard Weisberger
Attorney, Agent, or Firm—Connolly & Hutz

[57] ABSTRACT

Electret fibers having improved charge stability are described which are composed of a material which predominantly contains a fiber-forming polymer or polycondensate and 0.01 to 30% by weight (preferably 0.01 to 10, in particular 0.1 to 5%, by weight), based on the weight of the material, of organic or organometallic charge control compounds, as contained in toners for electrophotographic processes, and a process for the production thereof. In addition, textile materials containing these electret fibers are described.

11 Claims, No Drawings

ELECTRET FIBERS HAVING IMPROVED CHARGE STABILITY, PROCESS FOR THE PRODUCTION THEREOF AND TEXTILE MATERIAL CONTAINING THESE ELECTRET FIBERS.

The present invention relates to electret fibers, which have a considerably improved charge stability because of the content of charge control compounds, production thereof and threadlike and sheetlike textile materials, in particular yarns, tows and nonwoven webs which are composed of these improved electret fibers or contain these.

Electret fibers in the sense of this invention are fibers of electrically nonconducting materials which have the capacity to store an applied electrostatic charge for a relatively long time.

Electret fibers have been described hitherto chiefly in connection with the problem of very fine dust filtration. (e.g. By Biermann, "Evaluation of permanently charged elektrofibrous filters", 17. DOE Nuclear Air Cleaning Conference, Denver, USA, (1982) and in L. Bergman, Chemiefasern/Textilindustrie 40/92, (1990/9)) page T123. The filter materials described differ with respect both to the materials of which the fibers are composed and the manner in which the electrostatic charge is applied to the fibers.

The electrostatic charge can be applied by various methods.

It is thus possible to charge polymer films differently on both sides electrostatically and then to split them. In this case so-called split-film fibers are obtain ed which are generally deposited as a nonwoven fiber web. It is further known to spin into a strong electrostatic field or to subject the spun fibers or fiber products, e.g. nonwoven webs, to an electric corona discharge, e.g. between high-voltage points or wires and earthed surface electrodes.

Charging by triboelectric effects is particularly advantageous, i.e. charge separation by rubbing the fiber materials with other media, e.g. other polymer materials, solids such as metal surfaces or alternatively liquid or gaseous media.

Various fiber raw materials have been previously examined and recommended in order to produce electret fibers having advantageous electret properties, such as long-term charge stability, moisture resistance and chemical resistance. These advantageous properties should also be achievable at the lowest possible cost.

Fluoropolymers such as polytetrafluoroethylene or perfluorinated ethylene/propylene copolymers have proved themselves as very good electret materials which combine high charge stability, characterized by a charge half life (charge duration) of years to decades, with good temperature stability and low moisture absorbance. However, serious disadvantages of these polymers such as their high price and the great difficulties of their processing have substantially prevented their use.

Good resistance to chemicals and moisture is also possessed by electret fibers made of polyolefins, such as polyethylene and polypropylene, or of polycarbonates. Commercial very fine dust filters are composed of these electret materials (Chemiefasern/Textilindustrie, as cited above). A serious disadvantage of these fibers is the relatively low charge half life which is only of the order of magnitude of about 1 year. This is generally too short a period if it is considered that, e.g., when the fibers are used for filter production, the time from the fiber production up to the use of the filter plus the filter life can easily be above one year.

For as long as electret fibers have been recommended and used for the production of very fine filters, there has therefore been a constant urgent requirement to find a fiber material which combines moderate price with significantly improved charge stability, resistance to moisture and chemicals and good textile and mechanical properties and proposals therefor have also already become known.

In U.S. Pat. No. 4,789,504 it is recommended to increase the effectiveness of polypropylene electret filters by adding a salt of a fatty acid to the polymer material.

Journal of Electrostatics, 24 (1990) pp. 283–293 discloses that the temperature at which, under standardized conditions of measurement, the charge density of a polyacrylate electret decreases by half increases from 126° to 180° C. if approximately 10% by weight of titanium dioxide are added to the polymer. However, this addition, apart from an impairment of mechanical properties, has as a consequence an increased moisture sensitivity which opposes a use in filter materials.

It has now been found that it is possible to produce fibers which have excellent textile properties and a significantly increased half life of the electric charge, i.e. a considerably improved charge stability.

The electret fibers according to the invention with improved charge stability have as a feature that they are composed of a material which predominantly contains a fiber-forming polymer or polycondensate and 0.01 to 30% by weight (preferably 0.01 to 10, in particular 0.1 to 5% by weight), based on the weight of the material, of organic or organometallic charge control compounds.

Fibers in the present invention are taken to mean endless fibers (filaments) or staple fibers, preferably having staple lengths of 0.5 to 50 mm, or pulp, split fibers or split-film fibers which can also be present in special embodiments for special applications.

Electret fibers having low or partial orientation, i.e. those which have been drawn only a little or not at all, can be used in the same manner as normal fibers as melded fibers for bonding, consolidating and stiffening e.g. nonwoven webs; high-shrink electret fibers can be used for enhancing the density and stiffening textile sheet materials, in particular nonwoven webs.

Multicomponent electret fibers can occur in a core/shell arrangement or also in a side-to-side arrangement, one of the components being the electret fiber according to the invention.

Multicomponent fibers and the production thereof are described, e.g., in "Falkai, Synthesefasern [synthetic fibers]", pages 124 ff. in particular FIG. 5.4.

Multicomponent fibers having an electret component according to the invention can be used for particular purposes, e.g. side-to-side fibers as self-crimping fibers, if the components have differing heat shrinkage; core/shell fibers as adhesive fibers, if the shell has a relatively low melting point, or, with an appropriate cross-sectional arrangement of the components, e.g. in the island/sea arrangement, also as split fibers for the production of particularly fine linear density electret fibers.

A further interesting core/shell arrangement of the fibers according to the invention is a core of normal polymer material and a shell of electret material.

Preference is given to fibers according to the invention having a particularly high surface area, i.e. fine linear densities e.g. below 3 dtex, in particular below 2 dtex, or multilobal profiled fibers, e.g. polygonal or star-shaped profiles or, for example, ribbon or dumbbell profiles.

The fibers can be present in all processing states, for example as monofilaments, as an aggregate or flock, as a pulp slurry, as linear products such as spun fiber yarn, multifilament yarn, tows, slivers, or as sheet materials such as random nonwoven webs of staple fibers or filaments, in particular spunbonded fabrics or card webs, interlaid fabrics, woven fabrics or knitted fabrics.

Particular preference is given to the electret fibers according to the invention in the form of multifilament yarns, tows and nonwoven webs.

This invention relates both to the electrically neutral fibers and fiber products, such as, for example, yarns, tows or nonwoven web fabrics, and to the electrostatically charged fibers and fiber products. It is immaterial in this case whether the charge was applied specifically (e.g. by corona discharge) or arose spontaneously owing to triboelectric effects.

While the improved electrical properties of the electret fibers according to the invention are essentially due to the characteristic electret behavior of the material used for their production, the application-related merits result in their entirety from the advantageous combination of electrical and mechanical and shape-related properties.

The material which the fibers according to the invention are composed of features an improved charge stability. This is expressed in a significantly improved application behavior in all applications in which the presence of an electrostatic charge of the fibers plays a positive role, for example in the use of the electret fibers according to the invention for the production of dust filters.

The improvement of the charge stability is achieved according to our previous knowledge on the one hand via an improvement of the charge retention, i.e. the maintenance of a charge state once produced of the fibers under application conditions, and on the other hand via the effect of spontaneous charge formation by triboelectric effects which lead to a dynamic equilibrium of the charging. In practice, both effects would be able to interact, possibly in differing proportions, according to which polymer material is predominantly contained in the fiber material.

The effect of the improved charge retention is manifested in that the material, of which the electret fibers according to the invention are composed, a) after an electrical charge shows a maximum of the discharge current at a temperature above 50° C., preferably between 100° and 250° C., in particular between 100° and 180° C., the discharge current curve, after passing through the maximum, again showing a pronounced falling branch, and b) at 25° C. has a half life of the electrical charge of at least 6 months, c) its charge-halving temperature being above 100° C., preferably between 100° and 250° C., in particular between 100° and 180° C. and d) after a standard charge (film of 50 µm thickness, earthed on one side, exposed for 3 min to a corona discharge), has a charge density of at least $1 \cdot 10^{-9}$ Coulomb/cm$^2$.

The measurement of the discharge current of the material is carried out in such a manner that a circular sample of a film produced from the material, clamped in a holder, is vapor-coated on one side with an aluminum coating, is laid with the metallized side on an earthed metal block and is charged for 3 min with a corona discharge from the free side. The sample is then cooled and conditioned for a few hours at room temperature. The discharge of the electret sample is then measured with the aid of the "air gap current TSC" method (described in "Electrets", Editor G. M. Sessler, in "Topics in Applied Physics", 2nd edition, (1987), Vol. 33, pp. 95 ff., Springer Verlag) at a heating rate of 2° C./min.

During the heating, the discharge current is continuously measured and recorded against the temperature.

In addition to the rate of discharge, the position of the temperature peak of the discharge current and the presence of a falling branch of the discharge curve after the peaks is characteristic for the material.

The half life of the electric charge is the period within which the charge originally applied to the electret material has decreased by half at 25° C.

The charge halving temperature is taken to mean that temperature at which, at a heating rate of 2° C./min, the charge density of the material decreases to half of its value at 25° C.

Many electret fibers according to the invention surprisingly show a high triboelectric effect, i.e. they have a pronounced tendency to charge spontaneously by interaction with each other and with their surroundings. This leads to, e.g., a dust filter composed of these fibers or containing these fibers, even without a separate electric charge (e.g. by a corona discharge), spontaneously achieving a significantly higher electrostatic charge when gases flow through (e.g. in use) or by rubbing of the fibers against each other or against other types of solid materials and thus achieving a significantly better particle separation than an identically constructed dust filter made of normal fibers.

It is particularly surprising that the significant improvement of the degree of separation of dust particles results even when, for example, at a distance of a few centimeters from the filter material, no electrostatic field at all can be measured.

The relative improvement, which can be easily measured under standard conditions, of the degree of separation TR$_\%$ in [%] of a nonwoven web fabric filter made of electret fibers according to the invention compared with an identical filter made of normal fibers therefore represents a parameter which is very highly suitable for characterizing the improvement of the charge stability of the electret fibers according to the invention.

To determine the fiber parameter TR$_\%$, a nonwoven web fabric is produced from the electret fibers according to the invention to be examined having a weight per unit area of 100±5 g/m$^2$, a fiber dtex of 1.7±0.2 and a density equivalent to a pressure difference upstream and down-stream of the filter of 8–12 Pa at a flow velocity of 20 cm/s, which is composed of 80% by weight of the electret fibers to be tested and 20% by weight of bicomponent bonding fibers.

In addition, a second nonwoven web fabric filter, identical with respect to weight per unit area, fiber dtex and density, is produced, but which contains normal fibers (i.e. fibers from the same polymer material but without a content of charge control compound) instead of the electret fibers to be investigated.

The degree of separation is measured of both filters for dust particles having a mean particle size of 0.3 to 0.5 µm. If T(x) is the degree of separation of the filter according to the invention and T'(x) is that of the comparison filter, then $T_E = \ln(1-T(x))$ and $T_V = \ln(1-T'(x))$ for values of x from 0.3 to 0.5 µm and TR$_\%$ is given by the formula $$TR_\% [\%] = \frac{T_E * 100}{T_V} - 100$$

Electret fibers according to the invention have a TR$_\%$ value of at least 30%, preferably at least 50%, for example of 40 to 60%, and/or they have the features given under items a) to d) above, characterizing their charge retention behaviour.

For electret fibers according to the invention which are produced based on a polymer having a low charge retention, the $TR_\%$ value essentially characterizes the contribution of the triboelectric effect to the improvement of the charge stability of the electret fibers compared with normal fibers.

The improvement of the charge stability clearly correlates in certain limits with the concentration of the charge control compound in the material of the electret fibers according to the invention.

The concentration is set so that the fibers, compared with conventional fibers, have a sufficient improvement of the electrical properties with simultaneous retention of good textile and mechanical properties.

The improved electrical properties result from the composition of the material.

The material is generally predominantly composed of a polymer or polycondensate, but can contain other polymers or monomers or also inorganic additives which are conventionally present in synthetic fiber materials to develop special properties. As only one example, the dulling compositions can be mentioned.

Polymers in this invention are taken to mean not only the high molecular compounds obtained by polymerization such as polyolefins, polyacrylates, polyacrylonitrile and the like, but also those which can be produced by polycondensation such as polyesters or polyamides etc.

The polymers and polycondensates which are predominantly contained in the material to be used according to the invention generally have intrinsic viscosities of 0.45 to 1.2, preferably 0.6 to 0.9 dl/g, measured in dichloroacetic acid at 25° C.

The fiber-forming polymer or polycondensate of the material to be used according to the invention can be melt-spun or solution-spun.

Polymers which can be spun from solutions by wet or dry spinning processes permit the use of less thermally stable charge control compounds.

A feature of one embodiment of the invention is that the material predominantly contains a fiber-forming polymer selected from the group comprising polyolefins, halogenated polyolefins, polyacrylates, polyacrylonitrile, polystyrene and fluoropolymers.

Preferably, such a material predominantly contains a fiber-forming polymer selected from the group comprising polyethylene, polypropylene, polyacrylonitrile, polytetrafluoroethylene and perfluorinated ethylene/propylene copolymer, in particular selected from the group comprising polyethylene and polypropylene.

A feature of another embodiment of the invention is that the material predominantly contains a fiber-forming polycondensate selected from the group comprising polyesters, in particular poly(alkylene terephthalate), e.g. poly(ethylene terephthalate), polycarbonates, aliphatic or aromatic polyamides, polyimides, polyetherketones (e.g. PEK and PEEK), poly(arylene sulfides) in particular poly(phenylene sulfide), polyacetals and cellulose esters, in particular cellulose 2½- and triacetate.

Electret fibers according to the invention made of aromatic polyamides, polyetherketones (e.g. PEK and PEEK), and poly(arylene sulfides), in particular poly(phenylene sulfides), satisfy in particular requirements for increased chemical and/or thermal resistance.

A feature of a further preferred embodiment of the invention is that the material predominantly contains a fiber-forming polycondensate selected from the group comprising polyesters, polyetherketones and poly(phenylene sulfide), in particular poly(alkylene terephthalate). A feature of a further preferred embodiment of the invention is that the material predominantly contains polypropylene.

Polypropylene electret filaments and polyester electret filaments according to the invention can be used with particular advantage in motor vehicle assembly from the aspect of single product type (easy recyclability).

The material of the electret fibers according to the invention contains a charge control compound such as is contained in toners for electrophotographic processes. Charge control compounds for electrophotographic processes are disclosed in great numbers by the patent literature.

The material therefore contains as charge control compound one or various compounds selected from the following classes:

Triphenylmethanes; ammonium and immonium compounds; fluorinated ammonium and immonium compounds; biscationic acid amides; polymeric ammonium compounds; diallylammonium compounds; aryl sulfide derivatives; phenol derivatives; phosphonium compounds and fluorinated phosphonium compounds; calix (n)arenes; metal complex compounds; benzimidazolones; or azines, thiazines or oxazines which are listed in the Color Index as Pigments, Solvent Dyes, Basic Dyes or Acid Dyes.

The charge control compounds are preferably contained in the fiber material predominantly in the dispersed form. This means that the material preferably represents a multiple phase system in which the charge control compound forms a finely divided solid phase which is finely distributed in the continuous phase of the fiber-forming polymer or polycondensate.

"Predominantly" in the context of this invention is taken to mean that a certain usually small proportion of the charge control compound can also be truly dissolved in the fiber-forming polymer or polycondensate, i.e. is present in molecular distribution. The size of this proportion is clearly dependent on the solubility of the charge control compound in the polymer or polycondensate. The lower limit of the mean particle size of the dispersed charge control compounds can be at the lower limit of colloidal distribution, i.e. on average at least one dimension of the particles has a size of about 1 nm. The upper limit is generally at about 20 $\mu$m.

In particular cases, e.g. in the production of the dispersions by precipitation operations or by special crystallization or grinding processes, the charge control compounds can also have mean particle sizes of below 1 nm or above 20 $\mu$m.

In special cases, the particle size of the charge control compounds to be dispersed can expediently be adjusted so that the optimal charge stabilization results. Obviously, the (re)dispersibility (i.e. the disaggregation of any agglomerates formed from primary particles and/or aggregates) and the homogenizability of the dispersions must also be properly taken into account.

In practice, particle sizes of 0.01 to 10 $\mu$m, in particular 0.03 to 1.0 $\mu$m have proved useful for the charge control compounds dispersed into the electret fibers according to the invention.

The stability of the dispersion of the charge control compounds contained therein over relatively long periods and/or under stressful conditions is also of particular importance for the application properties of the electret fibers according to the invention.

As narrow as possible a particle size distribution of the charge control compounds in the electret fibers according to the invention is also particularly advantageous.

Charge control compounds which are contained individually or in combination with each other in the electret fibers according to the invention and impart very good electret properties to the fibers are:

1.
Triarylmethane derivatives such as: Color Index Pigment Blue 1, 1:2, 2, 3, 8, 9, 9:1, 10, 10:1, 11, 12, 14, 18, 19, 24, 53, 56, 57, 58, 59, 61, 62, 67 or for example Color Index Solvent Blue 2, 3, 4, 5, 6, 23, 43, 54, 66, 71, 72, 81, 124, 125, and the triarylmethane compounds listed in the Color Index under Acid Blue and Basic Dye, if they are suitable with respect to their temperature stability and processability, such as Color Index Basic Blue 1, 2, 5, 7, 8, 11, 15, 18, 20, 23, 26, 36, 55, 56, 77, 81, 83, 88, 89, Color Index Basic Green 1, 3, 4, 9, 10, in turn Color Index Solvent Blue 125, 66 and 124 being very particularly suitable.

Color Index Solvent Blue 124 in the form of its highly crystalline sulfate or the trichlorotriphenylmethyl tetrachloroaluminate is very particularly suitable.

Further examples of charge control compounds of the triphenylmethane series, which are very suitable for the production of electret fibers according to the invention, are those compounds described in DE-C-1 919 724 and DE-C-1 644 619.

In addition, triphenylmethanes as described in U.S. Pat. No. 5,051,585, in particular those of the formula I

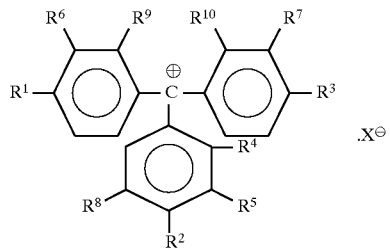

in which
- $R^1$ and $R^3$ are identical or different and are —$NH_2$, a mono- or dialkylamino group, the alkyl groups of which have 1–4, preferably 1 or 2, carbon atoms, a mono- or di-omega-hydroxyalkylamino group, the alkyl groups of which have 2–4, preferably 2, carbon atoms, an unsubstituted or N-alkylsubstituted phenyl- or phenalkylamino group, the alkyl of which has 1–4, preferably 1 or 2, carbon atoms, the phenalkyl group of which has 1 to 4, preferably 1 or 2, carbon atoms in the aliphatic bridge and the phenyl nucleus of which can carry 1 or 2 of the following substituents: alkyl having 1 or 2 carbon atoms, alkoxy having 1 or 2 carbon atoms and the sulfonic acid group,
- $R^2$ is hydrogen or has one of the meanings given for $R^1$ and $R^3$,
- $R^4$ is hydrogen, halogen, preferably chlorine, or a sulfonic acid group or, together with $R^5$, forms a fused phenyl ring,
- $R^5$ together with $R^4$ forms a fused phenyl ring,
- $R^6$, $R^7$, $R^9$ and $R^{10}$ are each hydrogen or an alkyl radical having 1 or 2 carbon atoms, preferably methyl and
- $R^8$ is hydrogen or halogen, preferably chlorine, and
- $X^-$ is one equivalent of an anion, in particular a chloride, sulfate, molybdate, phosphomolybdate or borate anion.

A charge control compound of the formula 1 is particularly preferred in which $R^1$ and $R^3$ are phenylamino groups, $R^2$ is an m-methylphenylaminogroup and the radicals $R^4$ to $R^{10}$ are all hydrogen.

2.
Ammonium and immonium compounds as described in U.S. Pat. No. 5,015,676.

3.
Fluorinated ammonium and immonium compounds as described in U.S. Pat. No. 5,069,994, in particular those of the formula 3

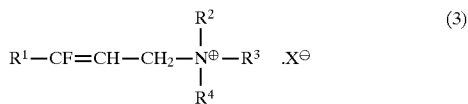

in which
- $R^1$ is perfluorinated alkyl having 5–11 carbon atoms,
- $R^2$, $R^3$ and $R^4$ are identical or different and are alkyl having 1–5, preferably 1–2, carbon atoms,
- $X^-$ is one equivalent of an anion, preferably a tetrafluoroborate or tetraphenylborate anion.

Preferably,
- $R^1$ is perfluorinated alkyl having 5–11 carbon atoms, $R^2$ and $R^3$ are ethyl and
- $R^4$ is methyl 4.
Biscationic acid amides as described in PCT-A-91/10172, in particular those of the formula 4

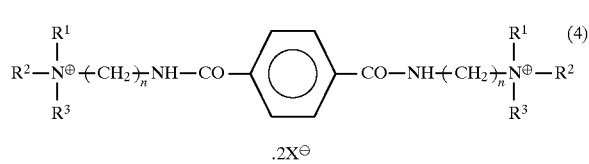

in which
- $R^1$, $R^2$ and $R^3$ are identical or different alkyl radicals having 1–5 carbon atoms, preferably methyl,
- n is an integer from 2 to 5,
- and $X^-$ is one equivalent of an anion, preferably a tetraphenylborate anion.

5.
Diallylammonium compounds as described in DE-A-4 142 541, in particular those of the formula 5

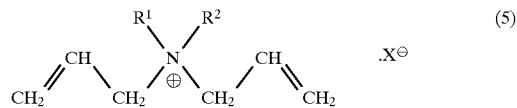

in which
- $R^1$ and $R^2$ are identical or different alkyl groups having 1–5, preferably 1 or 2, carbon atoms, but in particular are methyl groups and $X^-$ is one equivalent of an anion, preferably a tetraphenylborate anion, and the polymeric ammonium compounds of the formula 6 (as described in DE-A-4 029 652 or DE-A-4 103 610) obtainable from these,

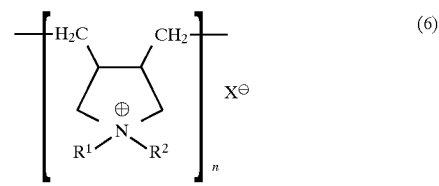

in which n has a value which corresponds to molecular weights from 5,000 to 500,000. However, compounds of the formula 6 having molecular weights from 40,000 to 400,000 are particularly preferred.

6.
Aryl sulfide derivatives as described in DE-A-4 031 705, in particular those of the formula 7

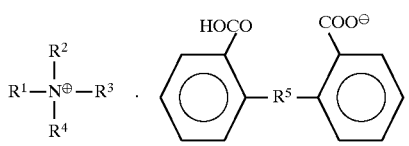
(7)

in which

R$^1$, R$^2$, R$^3$ and R$^4$ are identical or different alkyl groups having 1–5, preferably 2 or 3, carbon atoms and R$^5$ is one of the divalent radicals —S—, —S—S—, —SO— or —SO$_2$—. For example, R$^1$ to R$^4$ are propyl groups and R$^5$ is the group —S—S—.

7.

Phenol derivatives as described in EP-A-0 258 651, in particular those of the formula 8

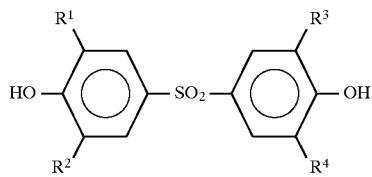
(8)

in which

R$^1$ and R$^3$ are alkyl or alkenyl groups having 1 to 5, preferably 1 to 3, carbon atoms and R$^2$ and R$^4$ are hydrogen or alkyl having 1 to 3 carbon atoms, preferably methyl. Examples which can be mentioned are the compounds in which R$^1$ to R$^4$ are methyl groups or in which R$^2$ and R$^4$ are hydrogen and R$^1$ and R$^3$ are the group —CH$_2$—CH=CH$_2$.

8.

Phosphonium compounds and fluorinated phosphonium compounds as described in U.S. Pat. No. 5,021,473 and in U.S. Pat. No. 5,147,748, in particular those of the formulae 9

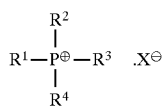
(9)

in which

R$^1$, R$^2$, R$^3$ and R$^4$ are identical or different alkyl groups having 1–8, preferably 3 to 6, carbon atoms and X$^-$ is one equivalent of an anion, preferably a halide anion and 10;

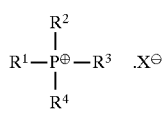
(10)

in which

R$^1$ is a highly fluorinated alkyl radical having 5–15, preferably 6–10, carbon atoms, R$^2$, R$^3$ and R$^4$ are alkyl having 3–10 carbon atoms or phenyl and X$^-$ is one equivalent of an anion.

An example of a compound of the formula 9 which can be mentioned is tetrabutylphosphonium bromide, examples of compounds of the formula 10 which can be mentioned are the compounds having R$^1$=C$_8$F$_{17}$—CH$_2$—CH$_2$—, R$^2$=R$^3$=R$^4$= phenyl and X$^-$=PF$_6$— or the tetraphenylborate anion.

9.

Calix(n)arenes as described in EP-A-0 385 580 and as described in EP-A-0 516 434, in particular those of the formula 11

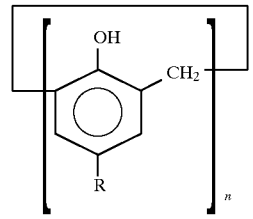
(11)

in which

R is hydrogen, halogen, preferably chlorine, straight-chain or branched alkyl having 1–12 carbon atoms, aralkyl, e.g. benzyl or phenethyl, —NO$_2$, —NH$_2$, —NHR$^1$ or HR$^1$R$^2$, in which R$^1$ is alkyl having 1–8 carbon atoms, unsubstituted or substituted phenyl or —Si(CH$_3$)$_3$.

10.

Metal complex compounds, such as chromium azo complexes, cobalt azo complexes, iron azo complexes, zinc azo complexes or aluminum azo complexes or chromium salicylic acid complexes, cobalt salicylic acid complexes, iron salicylic acid complexes, zinc salicylic acid complexes or aluminum salicylic acid complexes of the formulae 12, 13 and 14

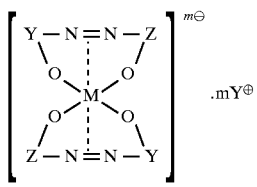
(12)

in which

M is a divalent or trivalent metal atom, preferably chromium, cobalt, iron, zinc or aluminum, Y and Z are divalent aromatic rings, preferably of the formulae

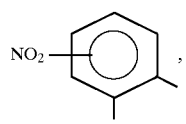

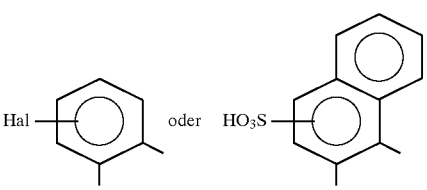

m is one of the numbers 1 or 2 and K$^+$ is one equivalent of a cation,

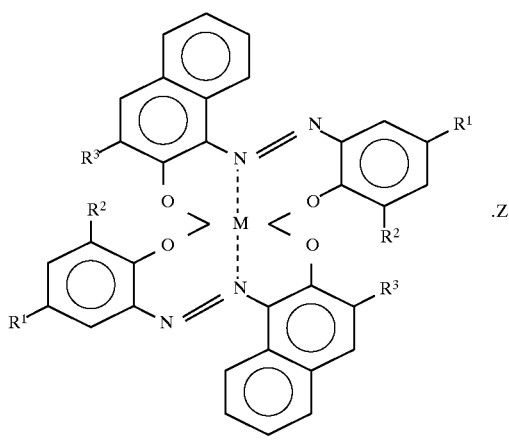

(13)

in which

M is a divalent or trivalent metal atom, preferably chromium, cobalt, iron, $R^1$ is hydrogen, halogen, preferably Cl, nitro or amidosulfonyl, $R^2$ is hydrogen or nitro, $R^3$ is hydrogen, the sulfonic acid group, —CO—NH—$R^4$, in which $R^4$=phenyl, alkyl having 1–5 carbon atoms, which can be unsubstituted or substituted by a mono-, di- or trialkylamino group and Z is a counter ion which produces the neutrality of the complex, preferably a proton, an alkali metal ion or an ammonium ion,

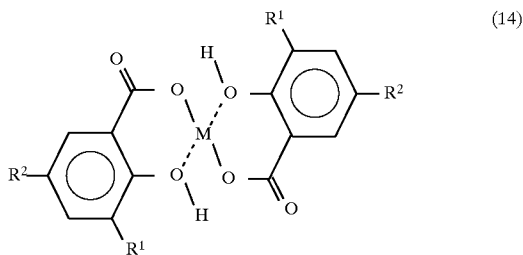

(14)

in which

M is a divalent metal central atom, preferably a zinc atom, $R^1$ and $R^2$ are identical or different, straight-chain or branched alkyl groups having 1–8, preferably 3–6, carbon atoms, for example tert-butyl.

Such compounds are described in EP-A-0 162 632, U.S. Pat. No. 4,908,225, EP-A-0 393 479, EP-A-0 360 617, EP-A-0 291 930, EP-A-0 280 272, EP-A-0 255 925, EP-A-0 251 326, EP-A-0 180 655, EP-A-0 141 377, U.S. Pat. No. 4,939,061, U.S. Pat. No. 4,623,606, U.S. Pat. No. 4,590,141 and/or characterized by the CAS numbers 31714-55-3, 104815-18-1, 84179-68-8, 110941-75-8, 32517-36-5, 38833-00-00, 95692-86-7, 85414-43-3, 136709-14-3, 135534-82-6, 135534-81-5, 127800-82-2, 114803-10-0, 114803-08-6.

Examples of particularly preferred metal complex compounds of the above formula 13 are given in the following table.

TABLE

| $R^1$ | $R^2$ | $R^3$ | $R^4$ | M | Z |
|---|---|---|---|---|---|
| Cl | H | H | — | Cr | $H^+$ |
| $NO_2$ | $NO_2$ | —$CONHR^4$ | Phenyl | Cr | $H^+/Na^+/NH_4^+$ |
| Cl | H | —$CONHR^4$ | Phenyl | Fe | $H^+/Na^+/NH_4^+$ |
| Cl | H | —$CONHR^4$ | —$(CH_2)_3$—$N^+(CH_3)_3$ | Cr | $Cl^-$ |
| —$SO_2NH_2$ | H | H | — | Co | $H^+/Na^+/NH_4^+$ |

11.
Benzimidazolones as described in EP-A-0 347 695, in particular those of the formula 15

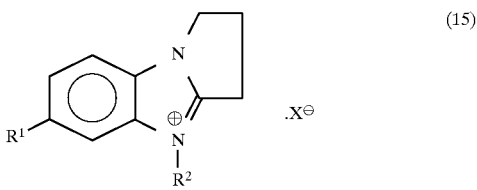

(15)

in which $R^1$ is alkyl having 1–5 carbon atoms and $R^2$ is alkyl having 1–12 carbon atoms and X is one equivalent of an anion, in particular a chloride or tetrafluoroborate anion (an example which can be mentioned is the compound having $R^1$=$CH_3$ and $R^2$=$C_{11}CH_{23}$).

or azines of the following Color Index numbers: C.I. Solvent Black 5, 5:1, 5:2, 7, 31 and 50; C.I. Pigment Black 1, C.I. Basic Red 2 and C.I. Basic Black 1 and 2.

The material preferably contains, as charge control compound, one or more various compounds selected from the following classes:

Triphenylmethanes of the formula 1; diallylammonium compounds of the formula 5 and the polymeric ammonium compounds of the formula 6 obtainable therefrom; arylsulfide derivatives of the formula 7; metal complex compounds of the formulae 12 and 13.

Particular preference is given to electret fibers according to the invention, the material of which contains, as charge control compound, a compound of the formula 1, in which $R^1$ and $R^3$ are phenylamino and $R^2$ is 3-methylphenylamino and $X^-$ is one sulfate equivalent. This compound, known as C.I. Solvent Blue 124, corresponds to the following formula 16:

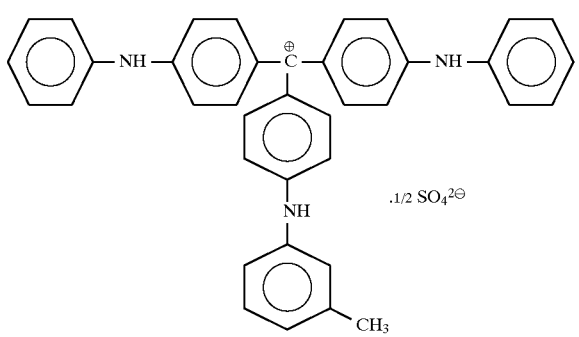

(16)

Particular preference is also given to electret fibers according to the invention, the material of which contains, as charge control compound, a compound of the formula 5 or 6, in which $R^1$ and $R^2$ are methyl and $X^-$ is a tetraphenylborate anion.

In addition, particular preference is given to electret fibers according to the invention, the material of which contains, as charge control compound, a compound of the formula 7, in which $R^1$, $R^2$, $R^3$ and $R^4$ are propyl and $R^5$ is a disulfide bridge, or of the formula 13, in which $R^1$ is chlorine, $R^2$ is hydrogen and Z is a proton.

The versatile possible applications of the electret fibers according to the invention are made possible by the combination of the above described material composition with the textile property data of the fibers to be established by the conditions employed during shaping. It is surprising in this case that the electret fibers can be produced with virtually the same spectrum of textile properties as the fibers which were produced from the corresponding polymer without addition of charge control compound.

The electret fibers according to the invention have a dtex in the range from 0.02 to 20.

For the case of "split-film fibers", a mean dtex of 0.02 to 30 is useful, with small proportions of coarser and finer fibers.

Fibers having a dtex of 0.02 to 1, in particular 0.02 to 0.5, are preferably produced by the "splitting" technique (not to be confused with the split-film technique). In this case, bicomponent fibers, which are produced from electret material and a material soluble in a solvent having "island in the sea" cross-sections, and the electret material forming the islands, are treated with the relevant solvent. The soluble portions of the bicomponent fiber dissolve and the extraordinarily fine island fibers are obtained.

A further feature of the electret fibers according to the invention is that the tensile strength of the fibers is 20 to 80, preferably 30 to 65, cN/tex, the extension at break is 10 to 200%, preferably 10 to 60%, in particular 20 to 50%, the heat shrinkage, measured at 200° C. dry ($S_{200}$) is 0 to 50%, preferably <10%.

The textile property data tensile strength, extension and heat shrinkage are conventionally controlled in accordance with requirement in production by setting the spinning speed, the drawing and the thermosetting conditions.

Tensile strengths of 20–30 cN/tex are interesting for special applications, where the fibers have to be able to tear at certain loads. The conventional textile application area demands strengths of approximately 30–60 cN/tex. Industrial fiber materials, on the other hand, must have high strengths in the range up to about 80 cN/tex.

The extension is also adjusted to be application-specific. For industrial high-strength yarns, low extensions of about 10–15% are demanded, normal textile applications are adapted to fiber materials having an extension of approximately 20–40%, for special applications, e.g. for the production of three-dimensionally deformable textile sheet materials, yarns having as high as possible an extensibility, for example up to 200%, are desired.

The shrinkage of fiber materials is adjusted to values below 10% for conventional textile applications, and for the production of staple fiber nonwoven webs, for example, to <5%. However, definite high-shrinkage fibers can also be of interest for special applications, e.g. for compression or crimping of textile sheet materials.

The electret fibers according to the invention can have a coating of finish of 0 to 0.3% by weight, preferably 0 to 0.15% by weight. A preferred embodiment of finished electret fibers according to the invention is that they have a hydrophobic finish, in particular one which contains wax as hydrophobizing agent, a fluorinated surfactant and/or a fluoropolymer, e.g. polytetrafluoroethylene.

As already indicated above, the electret fibers according to the invention can be present in various forms as linear or sheetlike products. In particular, they can be present in the form of multifilament yarns, tows and nonwoven webs.

The multifilament yarns according to the invention generally have, depending on the planned use, a dtex of 20 to 500 and 10 to 200 capillaries and have essentially the textile property values cited above of the electret fibers according to the invention. Obviously, the yarns can also be present as mixed yarns with other synthetic fibers or else natural fibers, the non-electret fibers being able to differ from the electret fibers according to the invention not only with respect to their electrical properties but also with respect to their conventional textile properties, such as tensile strength, extension at break, shrinkage behavior etc.

This is of importance in particular if special effects, such as high-bulk effects, loop-yarn effects, core-shell structures and the like are to be generated, or if the yarns are to contain melt fibers so that they stiffen on heating.

Tows are multifilament skeins having a few thousand to a few million individual capillaries, the choice within this range being made with regard to the planned final use.

The electret fibers according to the invention can be supplied in the form of tows to the further treatment and processing stages, e.g. the crimping, drawing, thermosetting, finishing, dyeing etc.

The electret fibers according to the invention can also be easily stored in the form of tows.

The nonwoven webs from the electret fibers according to the invention represent a particularly valuable form of these fibers. They are described in detail further below. Their main application area is in the production of very fine dust filters.

The electret fibers according to the invention can obviously also be present in combination with a nonelectret material as two-component fibers.

In this case, they can be present, for example, as a bicomponent fiber having a core/shell structure with a core of electret material of the composition specified in claim 1 and a shell of lower-melting polymer material. Such fibers can be used with particular advantage for the production of endless fiber nonwoven webs or staple fiber nonwoven webs which can be bonded by heating.

The electret fibers according to the invention can also be present as a bicomponent fiber having a core/shell structure with a core of normal fiber material, i.e. any spinnable polymer material, and a shell of electret material of the above specified composition.

The electret fibers according to the invention can also be processed together with other fiber materials, e.g. with effect yarns or melt fibers to give nonwoven web fabrics or spun or blown to give mixed yarns, e.g. commingle yarn.

The present invention also relates to a process for the production of the electret fibers according to the invention by spinning a fiber-forming material from the melt or from a solution in a suitable solvent, in which the wet spinning or dry spinning process can be employed in a manner known per se, if necessary cooling the spun filaments, taking up at a speed in the range of about 100 to 8,000 m/min, preferably from 1,000 to 5,000 m/min and further conventional process steps subsequent to this, such as if necessary drawing and, depending on the intended further use, random laying, combination to form yarns or tows, texturizing, thermosetting, chopping to form staple fibers, which comprises a material being spun which predominantly contains a fiber-forming polymer or polycondensate and 0.01 to 30% by weight (preferably 0.01 to 10, in particular 0.1 to 5% by weight), based on the weight of the material, of organic or organometallic charge control compounds.

Alternatively, the invention also relates to a process for the production of the electret fibers according to the invention by splitting splittable multilobal fibers, which contain segments of the electret material extending along the fiber axis, or by matrix dissolution of an "island in the sea" filament, the island regions of which are composed of the electret material, or by splitting a film of the electret material, which likewise comprises the electret material predominantly containing a fiber-forming polymer or polycondensate and 0.01 to 30% by weight (preferably 0.01 to 10, in particular 0.1 to 5% by weight), based on the weight of the material, of organic or organometallic charge control compounds.

Further alternatives for the production of the electret fibers according to the invention which are useful are the fiber blowing process, as described in German patent application 19 64 060 or the "Flash-spinning" in the electrostatic field, as described in U.S. Pat. No. 3,319,309, in each case with the use of the electret material to be used according to the invention.

On melt spinning, the electret material is heated to a temperature of about 30°–50° C. above the melting point of the polymer and the melt is extruded in a conventional manner through spinnerets. The temperature of the melt is selected within the range cited in such a way that an optimal flow of the material is established which permits the shear forces necessary for the orientation of the filaments to be built up at a not excessively high spinning pressure.

For example, a material which is predominantly composed of polypropylene, is spun at about 260° C. and a material based on polyester at approximately 280°–310° C.

If the polymer is spun from the melt, the filaments taken up from the spinneret orifices must be solidified by cooling. The cooling can be carried out in any known manner and enables the specific control of the filament properties in the processing of the electret material also. Thus, e.g., a delay of the cooling is possible by a reheater, if fibers having a specific shrinkage/strength characteristic are to be produced or a sharply asymmetrical quenching can be carried out if self-crimping fibers are to be produced. In particular for the production of fine individual filaments below 1 dtex a so-called central quenching is, on the other hand, advisable, which ensures a particularly uniform and thus stress-free cooling of the filaments.

Spinning the electret fibers according to the invention from solutions of the material in a suitable solvent is likewise carried out according to well known processes.

In this case, in principle, the same conditions can be selected as for normal polymers. The solidification of the solution exiting from the spinneret can be carried out, in dry spinning, by evaporation of the solvent or, in the case of wet spinning, by precipitating the material in filament form in a precipitation bath.

In this case, advantages result in particular with regard to the material composition. Namely, even those materials can be used which contain a charge control compound which is not stable at the melt temperature of the polymer material.

In the spinning processes mentioned, apart from spinnerets having round spinneret orifices, those having profiled orifices can also be used and multiple component filaments in side-to-side arrangement or of the core-shell type can be spun by special orifice arrangements or shapes known per se.

Spinning take up speeds down to 100 m/min are principally used for the production of yarn dtex above 4. Spinning take up speeds between 1,000 and 5,000 m/min are more economically interesting, in particular very fine dtex yarns being spun at the highest speeds of this range.

The production of the material to be spun according to the invention takes place by homogeneous incorporation of the charge control compounds into the polymer material of which the material is predominantly composed. It is particularly advantageous in this case to use the charge control compound in the form of a master batch.

The spun filaments are generally subjected to drawing, the extent of which is determined on the one hand by the spin orientation of the filaments, and on the other hand by the desired strength and extensibility properties. Whereas filaments which were obtained at spinning speeds below 1,000 m/min require extensive drawing if they are to be processed to form textile yarns or sheet materials, the extent of the drawing required decreases continuously with increasing spinning speed since these filaments already have a relatively high spin orientation.

Very fine dtex yarns which are spun at the highest speeds of this range therefore represent fully orientated filaments (so called FOY) and do not require any postdrawing.

If high-strength filaments are to be produced, drawing up to an extension at break of approximately 10% and below is conventional; for particularly extensible filaments, e.g. for the production of sheet materials capable of being deep-drawn, the drawing is only slight and the extent is selected so that extensions at break of up to 200% result.

The filaments can be subjected to drawing either in the form of multifilament yarns or in the form of tows.

The filament tension necessary for drawing can be produced by godets or by drawing jets or drawing ducts. Whereas godets pull the filaments or yarns along by rubbing on the rotating godet surface, in drawing jets or drawing ducts, the filaments are swept along by a strong airstream.

A particular importance is attached to the drawing ducts in the random laying of filament material for the production of random nonwoven webs, in particular of "spunbonded fabrics".

The drawing can be carried out at room temperature or at elevated temperature, in particular above the glass transition point. A so-called cold drawing generally leads to special high-shrinking filaments; hot drawing leads to filaments which have conventional shrinkage values of 0 to 10%, expedient for textile purposes.

The drawing of the filament materials can be carried out in a known manner in a single stage or multiple stages.

The electret fibers according to the invention can also be furnished with all known types of texturizing. It is thus possible to subject the filaments, preferably in tow form, to a stuffer box crimping; if relatively fine fiber bundles are present, they can be vortexed by vortexing jets with or without overfeed of part of the fed fibers to give more or less closed yarns or alternatively to give effect yarns or else to give loop yarns or they can be subjected to the false-twist texturizing or else to the draw-false-twist texturizing.

Other textile-related developments of the multifilament yarns result if the electret fibers according to the invention are spun in combination with fibers of differing shrinkage to give bicomponent yarns in which the initiation of shrinkage leads to a spontaneous crimping. The side-to-side bicomponent fibers already mentioned above having an electret portion can also be crimped by initiation of shrinkage with selection of a component having a shrinkage characteristic different from the electret material.

A particularly preferred form for the electret fibers according to the invention is, as already stated above, the form of nonwoven webs.

These nonwoven webs can, namely, be used with particular advantage for the production of highly effective and particularly long-lived dust filters, in particular very fine dust filters.

Surprisingly it has been found that high textile-related properties, in particular stability and a highly variable construction can be successfully combined with a very considerable increase in the half life of the electric charge if the fiber material of the nonwoven web fabric contains electret fibers according to the invention or is composed thereof.

Subject-matter of the present invention is thus a nonwoven web fabric which is composed of synthetic fibers or contains such, this nonwoven web fabric being at least partly made up of electret fibers according to the invention.

The proportion of the electret fibers in the nonwoven web fabric which imparts the desired combination of properties to this can in some circumstances be surprisingly small.

Often, a marked economical and technical advantage results even in the case of a nonwoven web fabric which contains at least 10% electret fibers.

Generally, it is expedient to use a nonwoven web fabric which contains 50–100% electret fibers, the highest technical requirements profiles clearly being able to be complied with by nonwoven web fabrics which are composed of 100% electret fibers.

The yarn dtex values of the synthetic fibers of the nonwoven web fabrics according to the invention and the products possibly produced therefrom, in particular the dust filters, are in the range conventional for these applications.

From case to case it can be expedient to use mixed dtex yarns, in particular in those nonwoven web fabrics which are not composed of 100% electret fibers, electret fibers and normal fibers can have different yarn dtex.

The synthetic fibers can be endless filaments or staple fibers, expediently having staple lengths of 0.2–200 mm.

In this case, nonwoven webs made of endless filaments are preferably present in the form of spunbonded fabrics, staple fibers having staple lengths below 20 mm are expediently processed by wet-deposition processes and staple fibers having staple lengths above 20 mm are expediently processed by carding to give nonwoven webs. However, it is also possible without difficulty to use nonwoven web fabrics which contain both endless filaments and staple fibers. Thus, e.g., in many cases the desired combination of properties of a filament nonwoven web fabric (one composed of endless filaments) can be adjusted by blending in a suitable proportion of electret staple fibers.

Furthermore, it can be expedient to produce nonwoven webs of mixtures of two or more types of electret fibers according to the invention, each type containing a different sort of the abovementioned charge control compounds.

Obviously, mixtures of electret staple fibers and normal staple fibers can also be deposited to form a spun fiber nonwoven web in random deposition.

This deposition can, as is conventional, be carried out by dry or wet deposition. The dry laying of the staple fibers is generally carried out on the card, the deposition of endless filaments is carried out by the spunbonded process directly after spinning. In this case, the spun filaments can further pass through a drawing duct, in which they are drawn and are accelerated to a speed advantageous for the deposition on the running screen. Solidification of the spunbonded fabrics is generally carried out by a calender passage of the freshly deposited filament mass.

The suitable synthetic fibers are generally composed of the abovementioned spinnable polymers, in particular of polyamide, polyacrylonitrile, polyethylene, polypropylene or polyester.

Synthetic fibers of polyester are preferred, in particular of poly(ethylene terephthalate) and of polypropylene.

The bonding (consolidating) of the nonwoven web fabrics can, in principle, be carried out in any known manner. Thus it is possible, for example, to bond the nonwoven web by a bonder with which the nonwoven web is impregnated and which is then hardened or the bonder can be a melt bonder which is incorporated into the nonwoven web, e.g., in powder form or in the form of bonding threads and which bonds and consolitates the nonwoven web to form nonwoven web fabric under the action of heat.

The bonding (consolidating) of the nonwoven web to form nonwoven web fabric can also be carried out by calendering, in part a mechanical felting of the filaments occurring, in part an autogenous welding at the crossing points occurring.

The melt adhesive material can clearly alternatively be introduced in the nonwoven web as a component of a side-to-side bicomponent fiber or as a shell of a core-shell bicomponent fiber.

Nonwoven web fabrics according to the invention have proved to be advantageous which have been mechanically bonded (consolidated). Mechanical bonding or consolidating is taken to mean, for example, needling or alternatively, e.g., hydromechanical bonding, as described, e.g., in EP-A-0 108 621.

A combination of the different bonding, consolidating or stiffening methods can also be carried out if required.

The weight per unit area of the nonwoven web fabrics according to the invention obviously depends on the planned use. Generally, this is 5 to 300 g/m$^2$, preferably 100 to 250 g/m$^2$, but for special purposes can also be above this, e.g. up to 1000 g/m$^2$.

Other preferred embodiments of the nonwoven web fabric according to the invention are a spunbonded fabric, in particular a spunbonded fabric consolidated by needling or melt adhesive or alternatively a dry- or wet-laid staple fiber nonwoven web fabric bonded and consolidated by melt adhesive.

If required, the nonwoven web fabric can also be combined with another textile material, e.g. another nonwoven web fabric or a textile material of defined yarn ply which is likewise composed of electret fibers or can contain these.

In particular, the combination with supporting and reinforcing textile materials or those acting as protective coating is occasionally desired. In a preferred embodiment, the electret fiber-containing nonwoven webs according to the invention are covered on one side or, in particular both sides, with a protective textile material, e.g. a nonwoven web fabric, in particular a fine nonwoven web. In particular on use of the nonwoven webs according to the invention as dust filters, the combination with coarse filters or depth filters is often useful.

The present invention also relates to a process for the production of the nonwoven web fabrics according to the invention by random deposition of synthetic endless filaments or staple fibers in a manner known per se (cf.: "Radko Krcema, Handbuch der Textilverbundstoffe [Handbook of composite textile fabrics]", Deutscher Fachverlag GmbH (1970), page 53) on a moving support, or by nonwoven web formation from staple fibers on the card, subsequent bonding, a feature of which is that at least some of the deposited synthetic fibers are electret fibers.

In the production of spun-fiber nonwoven web fabrics which according to the invention contain a proportion of electret fibers, a mixture of electret fibers and normal staple fibers in the desired mixing ratio can be deposited in a manner known per se dry or by a wet-laying method to form a nonwoven web and subsequently bonded (consolidated).

However, it is also possible to produce nonwoven web fabrics from endless filaments and staple fibers by providing an addition of the staple fibers during the deposition of the endless filaments. In this case, optionally, the endless filaments or the staple fibers can be wholly or partly composed of electret fibers.

In the production of the nonwoven web fabrics by the spunbonded process, it is also possible to mix normal fibers and electret fibers during the deposition. For this purpose, for example, the electret fibers can be produced separately and taken off from fiber reservoirs, e.g. bobbin frames, and fed by blowing jets into the fiber stream of the normal fibers, directed at the deposition, or the spinning beams, which serve for producing the nonwoven web filaments, apart from spinneret orifices for normal fibers, can also have spinneret orifices for electret fibers, the ratio of the different spinneret orifices and the amount of filaments spun therefrom corresponding to the desired ratio of normal fibers and electret fibers in the nonwoven web fabric.

Generally, for the production of nonwoven web fabrics according to the invention, at least 10% by weight of electret fibers are deposited or a fiber mixture, which contains at least 10% by weight of electret fibers, is processed by carding to form the nonwoven web.

The proportion of the deposited electret fibers is preferably 50 to 100%, and to achieve the maximum effect, 75 to 100% of the deposited fibers are electret fibers.

The consolidation of the nonwoven web to form the nonwoven web fabric is carried out in a manner known per se, using a bonder, or a melt bonder or by calendering, or preferably by mechanical means. However, it is also possible to combine several of these consolidation processes together. Bonders can be, e.g., polymer solutions or polymer dispersions or latexes, which are applied to the nonwoven web by impregnation or spraying and which form drop-like bonding points at the crossing points of the filaments after the evaporation of the liquid phase.

However, thermoset plastic bonders can also be used which, possibly in a heat treatment, harden and fix the fiber crossing points. Melt bonders, which are incorporated into the nonwoven web, e.g., in the form of powders or preferably in the form of bonding fibers and which join at the fiber crossing points when the nonwoven web is heated above its melting point and form bonding points, which, after cooling, consolidate the nonwoven web to form nonwoven web fabric, can also be used with great success.

A similar consolidation can be achieved by the "autogenous" welding of the nonwoven web filaments at their crossing points, if the nonwoven web is subjected to calendering near the melting temperature of the nonwoven web filaments.

Good results are also given by mechanical consolidation, e.g. by needling or by hydromechanical consolidation, as described, for example, in EP-A-0 108 621. In this case, no chemical or thermal stress of the filament material occurs, so that the advantageous physical properties which are imparted to the filaments owing to their production, e.g. by high speed spinning and drawing operations, are transferred undiminished to the nonwoven web fabric.

To produce a combination of a nonwoven web fabric according to the invention with a textile material of defined yarn ply, the nonwoven web fabric must be joined to this textile material in such a way that no delamination can occur. This requirement can best be complied with when the components are joined by needling, gluing or sewing.

The production of such composite fabrics by the weft-lapping Raschel technique is particularly preferred.

This is a warp-knitting technique in which the nonwoven web fabric is directionally reinforced by yarns, preferably high-strength yarns with or without a content of electret fibers or made of electret fibers. This warp-knitting technique is carried out on so-called Raschel machines. A particularly suitable Raschel machine for the production of a composite fabric configured according to the invention is the type RS 3 MSU-V from the company Karl Mayer, Textilmaschinenfabrik GmbH, Obertshausen.

The nonwoven webs, which are composed of the electret fibers according to the invention or contain an effective proportion of such, are, as already stated above, used with particular advantage for the production of very fine fabric filters.

Subject-matter of the present invention is therefore also this application of the electret fibers and the textile materials, in particular nonwoven web fabrics, containing them.

For production reasons it can be advantageous to provide the fibers, before the nonwoven web formation, with an antistatic finish which is only washed out at the end of the production process, e.g. after fabricating the filters.

It has surprisingly been shown in this context, that, in many cases in the production of the nonwoven webs, the antistatic used can be an unusually highly dilute finish or even water alone. This embodiment of the production process is particularly environmentally acceptable.

The filters are then specifically electrostatically charged, e.g. at a corona discharge.

Moreover, it has surprisingly been shown that in the production of the nonwoven webs from the electret fibers according to the invention on the card or in their use as filters, because of the through-flow of gases, a sufficient electric charge of the nonwoven webs is in most cases already achieved due to triboelectric effects so that a separate charging step can be dispensed with.

The following exemplary embodiments illustrate the implementation of the present invention.

EXAMPLE 1

Poly(ethylene terephthalate) fiber raw material was modified according to the invention by mixing with enough of the charge control compound of the formula 16 (C.I. Solvent Blue 124) in the form of a master batch, so that the concentration of the Solvent Blue 124 was 0.5% by weight in the spun material. The master batch was produced in this case from the highly crystalline form of the charge control compound, the X-ray (Cu—K alpha-radiation) diagram of which form showed a strong reflection at $2\delta°=18.47$, 3 medium-strength reflections at $2\delta°=6.97$; 12.1 and 13.9 and weak broad reflections at $2\delta°=20.0$; 21.7; 22.5; 24.8; 28.2; 30.7 and 32.2.

The material thus produced was spun by conventional melt-spinning technology. The spinning temperature was 285° C., the spinning take-up speed was 1500 m/min.

The spun material produced was processed by equally conventional production line technology (stuffer box crimping, thermosetting and chopping) to give wool-like staple fibers modified according to the invention having an individual fiber dtex of 1.3.

Nonwoven webs were produced on an experimental card from the modified staple fibers produced and from mixtures of these fibers with normal fibers (the normal fibers likewise had a dtex of 1.3) and, in each case, 20% by weight of bonding fibers (type: bicomponent fiber polyester/copolyester in a core/shell structure having a shell melting point of 110° C., 3 dtex) in the compositions given below. The parameters varied in this case were the weight per unit area (m) of the nonwoven webs and the proportion of the normal fibers. The nonwoven web consolidation was carried out thermally at 160° C. and a residence time of 3 minutes.

The separation efficiency of the nonwoven webs produced was tested in a conventional filter test stand which operates by the principle of measurement of light scattering.

The following test parameters were set:

Flow velocity: 20 cm/s, the respective pressure difference PD given below resulting, Particle mass concentration: 50 mg/m$^3$, Dust impingement time: varied from 1 to 3 minutes, Test dust: "ac fine" having the following composition:

| Particle size | Proportion of particles [%] |
|---|---|
| 0.3–0.5 µm | 55.5 |
| 0.5–1.0 µm | 17.3 |
| 1.0–3.0 µm | 26.6 |
| 3.0–5.0 µm | 0.5 |
| >5.0 µm | not relevant |

Sample 1 m=200 g/m$^2$;

PD=23 Pa;

80% by weight of the fibers modified according to the invention;

20% by weight of bicomponent bonding fibers

Sample 2 m=200 g/m$^2$;

PD=26 Pa;

40% by weight of fibers modified according to the invention;

40% by weight of normal fibers;

20% by weight of bicomponent bonding fibers

Sample 3 m=200 g/m$^2$;

PD=25 Pa;

80% by weight of normal fibers

20% by weight of bicomponent bonding fibers

Sample 4 m=100 g/m$^2$;

PD=10 Pa;

80% by weight of fibers modified according to the invention;

20% by weight of bicomponent bonding fibers

Sample 5 m=100 g/m$^2$;

PD=10 Pa;

80% by weight of normal fibers

20% by weight of bicomponent bonding fibers

The separation efficiencies achieved by these nonwoven web samples are given in the following tables:

TABLE 1

Degrees of separation of samples 1 to 5 after a dust-impingement time of 1 minute

| Particle size x [µm] | Degree of separation T(x) of the samples | | | | |
|---|---|---|---|---|---|
| | 1 | 2 | 3 | 4 | 5 |
| 0.3 | 0.81 | 0.71 | 0.62 | 0.64 | 0.44 |
| 0.5 | 0.85 | 0.77 | 0.70 | 0.71 | 0.52 |
| 1.0 | 0.89 | 0.82 | 0.77 | 0.77 | 0.61 |
| 3.0 | 0.96 | 0.95 | 0.93 | 0.90 | 0.82 |
| 5.0 | 0.98 | 0.98 | 0.99 | 0.94 | 0.94 |

TABLE 2

Degrees of separation of samples 1 to 3 after a dust-impingement time of 2 minute

| Particle size x [µm] | Degree of separation T(x) of the samples | | |
|---|---|---|---|
| | 1 | 2 | 3 |
| 0.3 | 0.81 | 0.74 | 0.64 |
| 0.5 | 0.86 | 0.80 | 0.72 |
| 1.0 | 0.90 | 0.86 | 0.79 |
| 3.0 | 0.97 | 0.97 | 0.94 |
| 5.0 | 0.99 | 0.99 | 0.98 |

TABLE 3

Degrees of separation of samples 1 to 3 after a dust-impingement time of 3 minute

| Particle size x [µm] | Degree of separation T(x) of the samples | | |
|---|---|---|---|
| | 1 | 2 | 3 |
| 0.3 | 0.81 | 0.77 | 0.65 |
| 0.5 | 0.86 | 0.82 | 0.73 |
| 1.0 | 0.90 | 0.87 | 0.81 |
| 3.0 | 0.98 | 0.97 | 0.95 |
| 5.0 | 1.00 | 1.00 | 0.99 |

EXAMPLE 2

As in Example 1, poly(ethylene terephthalate) fiber raw material was modified according to the invention with the charge control compound of the formula 16 (C.I. Solvent Blue 124). Mixing was performed as in Example 1, but here enough of the master batch was used so that the concentration of the Solvent Blue 124 was 1.0% by weight in the spun material. In this case also the highly crystalline form of the charge control compound used in Example 1 was employed.

Analogously to Example 1, the material thus obtained was spun, and in this case, a fiber dtex of 1.7 was produced. From the fiber material there was produced, as described in Example 1, a nonwoven web having a weight per unit area of 200 g/m$^2$ and a bonding fiber content of 20% by weight (bicomponent fiber as in Example 1) and the nonwoven web was consolidated.

The nonwoven web thus obtained is designated sample 6 below. For comparison, a nonwoven web was produced under exactly the same spinning and nonwoven web formation conditions, from poly(ethylene terephthalate) not modified with Solvent Blue 124. This nonwoven web is designated sample 7 below.

The separation efficiencies of these two nonwoven web samples are compared with each other in Table 4 below.

TABLE 4

Degrees of separation T(x) of the nonwoven web sample 6 (according to the invention) and 7 (comparison) after a dust impingement time of 1 to 10 minutes.

| | | Particle size x [μm] | | | | | | | | | |
|---|---|---|---|---|---|---|---|---|---|---|---|
| | | 0.3 | | 0.5 | | 1.0 | | 3.0 | | 5.0 | |
| | | Nonwoven web number | | | | | | | | | |
| | | 6 | 7 | 6 | 7 | 6 | 7 | 6 | 7 | 6 | 7 |
| Dust impingement time [min] | 1 | 0.89 | 0.81 | 0.92 | 0.86 | 0.95 | 0.89 | 0.98 | 0.95 | 1.00 | 0.98 |
| | 2 | 0.88 | 0.76 | 0.91 | 0.84 | 0.94 | 0.88 | 0.98 | 0.96 | 0.99 | 0.99 |
| | 3 | 0.92 | 0.80 | 0.95 | 0.86 | 0.96 | 0.90 | 0.99 | 0.97 | 1.0 | 0.99 |
| | 4 | 0.92 | 0.78 | 0.94 | 0.85 | 0.96 | 0.89 | 0.99 | 0.96 | 1.00 | 0.99 |
| | 5 | 0.91 | 0.76 | 0.94 | 0.83 | 0.96 | 0.87 | 0.99 | 0.96 | 0.99 | 0.99 |
| | 6 | 0.90 | 0.74 | 0.94 | 0.82 | 0.95 | 0.88 | 0.99 | 0.95 | 1.00 | 0.98 |
| | 7 | 0.90 | 0.72 | 0.93 | 0.80 | 0.95 | 0.85 | 0.99 | 0.95 | 1.00 | 0.98 |
| | 8 | 0.89 | 0.70 | 0.93 | 0.78 | 0.95 | 0.84 | 0.98 | 0.95 | 1.00 | 0.98 |
| | 9 | 0.88 | 0.68 | 0.92 | 0.76 | 0.94 | 0.83 | 0.99 | 0.95 | 1.00 | 0.98 |
| | 10 | 0.87 | 0.66 | 0.91 | 0.75 | 0.93 | 0.82 | 0.99 | 0.94 | 1.00 | 1.00 |

Table 4 shows particularly clearly the considerable improvement in the separation efficiency of the fine dusts after a relatively long dust impingement time which is acheived by the use of nonwoven web material according to the invention.

The following Table 5 shows that the nonwoven web material according to the invention surprisingly, even after discharge by a water treatment, retains its very good separation efficiencies without external charging to be carried out.

TABLE 5

Degree of separation T(x) of the nonwoven web sample 6 after immersion in water and subsequent drying.

| | Degree of separation T(x) of the nonwoven web sample 6 after water treatment | |
|---|---|---|
| Particle size x [μm] | Dust impingement time: 1 min | Dust impingement time: 2 min |
| 0.3 | 0.87 | 0.86 |
| 0.5 | 0.91 | 0.90 |
| 1.0 | 0.94 | 0.93 |
| 3.0 | 0.98 | 0.98 |
| 5.0 | 1.00 | 1.00 |

EXAMPLE 3

If, instead of the charge control compound of the formula 16 used in Example 1, one of the formula 6 is used in which $R^1$ and $R^2$ are methyl groups and $X^-$ is a tetraphenyl borate anion, the mean molar weight of which, determined by measurement of the solution viscosity, is approximately 300,000 and which has a melting point/decomposition point of 225° C., and the remainder of the procedure is carried out exactly as described in Example 1, a filter material is obtained which likewise has very good separation efficiencies. The charge control compound of the formula 6 used in this example can be prepared according to the description in the preparation Example 3 of DE-A-4 103 610. The table 6 below shows the degree of separation T(x) of the nonwoven web fabric filter obtained with this discharge control compound according to the invention.

TABLE 6

Degrees of separation T(x) of the nonwoven web fabric filter obtained with the charge control compound of the formula 6 after dust impingement times of 1 to 10 minutes.

| Particle size | Degree of separation T(x) of the nonwoven web fabric filter after a dust impingement time of 1 to 10 minutes | | | | | | | | | |
|---|---|---|---|---|---|---|---|---|---|---|
| [μm] | 1 | 2 | 3 | 4 | 5 | 6 | 7 | 8 | 9 | 10 |
| 0.3 | 0.85 | 0.84 | 0.83 | 0.81 | 0.80 | 0.78 | 0.75 | 0.75 | 0.74 | 0.72 |
| 0.5 | 0.90 | 0.89 | 0.87 | 0.87 | 0.86 | 0.85 | 0.83 | 0.83 | 0.82 | 0.80 |
| 1.0 | 0.93 | 0.92 | 0.92 | 0.91 | 0.91 | 0.89 | 0.88 | 0.88 | 0.87 | 0.86 |
| 3.0 | 0.98 | 0.98 | 0.97 | 0.96 | 0.98 | 0.96 | 0.96 | 0.97 | 0.97 | 0.96 |
| 5.0 | 0.99 | 0.99 | 0.99 | 0.98 | 1.00 | 0.99 | 0.98 | 0.99 | 0.99 | 0.99 |

What is claimed is:

1. An electret fiber having improved charge stability composed of a material predominantly containing a fiber-forming polymer selected from the group consisting of halogenated polyolefin, polyacrylates, polyacrylonitrile, polystyrene, fluoropolymers, polyethylene, polytetrafluoroethylene, and perfluorinated ethylene/propylene copolymer or polycondensate selected from the group consisting of polyesters, polycarbonates, aliphatic or aromatic polyamides, polyimides, polyetherketones, poly(arylene sulfides), polyacetals and cellulose ethers, and 0.01 to 30% by weight based on the weight of the material, of organic crystalline or organometallic crystalline charge control compounds contained in the material predominantly in particle form.

2. An electret fiber as claimed in claim 1, wherein the fiber-forming polymer or polycondensate is melt-spinnable.

3. An electret fiber as claimed in claim 1, wherein the fiber-forming polymer or polycondensate is solution-spinnable.

4. An electret fiber as claimed in claim 1, wherein the material predominantly contains a fiber-forming polycondensate selected from the group comprising polyesters, polyetherketones and poly(phenylene sulfide).

5. An electret fiber as claimed in claim 1, wherein the material contains, as charge control compound, one or various compounds selected from the following classes: triphenylmethanes; ammonium and immonium compounds; fluorinated ammonium and immonium compounds; biscationic acid amides; polymeric ammonium compounds; diallylammonium compounds; aryl sulfide derivatives; phenol derivatives; phosphonium compounds and fluorinated phosphonium compounds; calix(n)arenes; metal complex compounds; benzimidazolones; or azines, thiazines or oxazines which are listed in the Color Index as pigments, solvent dyes, basic dyes or acid dyes.

6. An electret fiber as claimed in claim 1, wherein the material contains, as charge control compound, one or more different compounds selected from the following classes:

triphenylmethanes of the formula 1; ammonium compounds and immonium compounds of the formula 2; fluorinated ammonium compounds and fluorinated immonium compounds of the formula 3; biscationic acid amides of the formula 4; diallylammonium compounds of the formula 5; the polymeric ammonium compounds of the formula 6 obtainable therefrom; aryl sulfide derivatives of the formula 7; phenol derivatives of the formula 8; phosphonium compounds and fluorinated phosphonium compounds of the formulae 9 and 10; calix(n)arenes of the formula 11; metal complex compounds of the formulae 12, 13 and 14; benzimidazolones of the formula 15; or azines of the following Color Index numbers: C.I. Solvent Black 5, 5:1, 5:2, 7, 31 and 50; C.I. Pigment Black 1, C.I. Basic Red 2, C.I. Basic Black 1 and 2 and C.I. Oxidation Base 1; or Thiazines of the following Color Index numbers: C.I. Basic Blue 9, 24 or 25 and C.I. Solvent Blue 8; or Oxazines of the Color Index numbers C.I. Pigment Violet 23, C.I. Basic Blue 3, 10 or 12; or the azines, thiazines and oxazines listed in the Color Index under basic dye or acid dye if they can tolerate the spinning temperatures and processing temperatures of the electret material.

7. An electret fiber as claimed in claim 1, wherein the material contains, as charge control compound, one or more different compounds selected from the following classes:

triphenylmethanes of the formula 1; diallylammonium compounds of the formula 5 and the polymeric ammonium compounds of the formula 6 obtainable therefrom; arylsulfide derivatives of the formula 7; metal complex compounds of the formulae 12 and 13.

8. An electret fiber as claimed in claim 1, wherein the material contains, as charge control compound, a compound of the formula 1, in which $R^1$ and $R^3$ are phenylamino and $R^2$ is 3-methylphenylamino and $X^-$ is one sulphate equivalent.

9. An electret fiber as claimed in claim 1, wherein the electret fiber has a dtex in the range of 0.02 to 15.

10. An electret fiber as claimed in claim 1, wherein the tensile strength of the fibers is 20 to 80, preferably 30 to 65, cN/tex, the extension at break is 10 to 200%, preferably 10 to 50%, in particular 20 to 30%, the heat shrinkage, measured at 200° C. dry ($S_{200}$), is 0 to 50%, preferably <10%.

11. An electret fiber as claimed in claim 1, wherein the electret fiber has an application of finish of 0 to 0.3% by weight, preferably 0 to 0.8% by weight.

* * * * *

UNITED STATES PATENT AND TRADEMARK OFFICE
CERTIFICATE OF CORRECTION

PATENT NO. : 5,871,845
DATED : February 16, 1999
INVENTOR(S) : Jorg Dahringer Zahn, et. al.

It is certified that error appears in the above-identified patent and that said Letters Patent is hereby corrected as shown below:

Title page:
 under "[73] Assignee", "Hiecgst Aktiengesellschat" should read -- Hoechst Aktiengesellschafts --.

Column 1, line 29, "obtain ed" should read -- obtained --.

Column 23, in Table 4, item 2 should read across:
"0.88, 0.78, 0.91, 0.84, 0.94, 0.88, 0.98, 0.96, 0.99, 0.99"; and item 6 should read across:
"0.90, 0.74, 0.94, 0.82, 0.95, 0.86, 0.99, 0.95, 1.00, 0.98".

Signed and Sealed this

Twenty-seventh Day of February, 2001

Attest:

NICHOLAS P. GODICI

Attesting Officer

Acting Director of the United States Patent and Trademark Office